United States Patent [19]
Frank

[11] 3,905,043
[45] Sept. 9, 1975

[54] TAPE TRACK-PLAYBACK HEAD ALIGNMENT ARRANGEMENT FOR A HELICAL SCAN VIDEO RECORDER

[75] Inventor: Egon Frank, Theisenort, Germany

[73] Assignee: Loewe-Opta GmbH, Berlin, Germany

[22] Filed: Apr. 2, 1973

[21] Appl. No.: 346,787

[30] Foreign Application Priority Data
Apr. 1, 1972 Germany .......................... 2216077

[52] U.S. Cl. ....................... 360/77; 360/70; 360/75
[51] Int. Cl.² ......................................... G11B 21/10
[58] Field of Search ...................... 178/6.6 P, 6.6 A; 179/100.2 T; 360/77, 70, 75

[56] References Cited

UNITED STATES PATENTS

| | | | |
|---|---|---|---|
| 3,126,535 | 3/1964 | Streeter | 360/77 |
| 3,474,432 | 10/1969 | Sevilla | 360/77 |
| 3,585,291 | 6/1971 | Yamakawa | 360/70 |
| 3,663,763 | 5/1972 | Trost | 360/70 |
| 3,663,764 | 5/1972 | Trost | 360/70 |

*Primary Examiner*—Daryl W. Cook
*Assistant Examiner*—Alan Faber

[57] ABSTRACT

An improved arrangement is described for detecting and correcting misalignments between the recorded video track on a magnetic tape and the scanning path of the playback head of a helical scan video recorder. The tape velocity is subjected to a sub-audio cyclic modulation by applying a suitable train of rectangular pulses to the brake of the tape drive. The resulting cyclic variation in the envelope of the track video output is translated into a train of variable duration pulses. The amount and direction of the deviation in the duration of each of such pulses from the corresponding quantities of a reference pulse are respectively converted to a DC error signal of proportional amplitude and appropriate polarity. This latter signal is applied to the brake as a superposition on the cyclic modulation of the tape velocity to converge the mean locus of the oscillating video track on the scanning path of the head.

9 Claims, 5 Drawing Figures

TAPE TRACK-PLAYBACK HEAD ALIGNMENT ARRANGEMENT FOR A HELICAL SCAN VIDEO RECORDER

BACKGROUND OF THE INVENTION

Helical scan video recorders have found increasing application in recent years in closed circuit television applications and training situations, as well as in broadcast recording.

In recorders of this type, a magnetic video tape is wound in a helix around a relatively large diameter rotatable drum. In a typical case, two magnetic playback heads are disposed 180° apart around the periphery of the drum. The pitch of the helix is selected so that the successive parallel video tracks on the tape (which tracks are disposed at an acute angle to the tape axis) are aligned transverse to the drum axis and are therefore parallel to the scanning path of the heads when the drum is rotated. The tape is longitudinally advanced at a speed which, relative to the speed of rotation of the drum, causes the heads to read out the video signals in a pattern matching that of the signals originally recorded on the tape.

In order to faithfully reproduce the video signal in the playback head, it is important to assure that the track to be scanned is aligned with the scanning path of the heads. Various techniques have been employed in the past for this purpose. One major technique calls for the oscillation of each head with respect to the track in a direction parallel to the drum axis. Such oscillation has been accomplished by mechanical vibration of the head relative to the track, which results in a corresponding cyclic variation in the video output from the track. Such variation may then be used as an error signal for a control circuit to correct the misalignment of the track and head.

Such a scheme is subject to errors due to the build-up of mechanical tolerances in, and manufacturing flaws during the fabrication of, the physical vibratory components. In addition, the necessity of incorporating such additional mechanical components, with their several inertias, into the mechanical drive systems of the recorder is itself a source of additional control system errors.

SUMMARY OF THE INVENTION

These disadvantages are overcome in the arrangement of the invention, which provides an oscillation-type apparatus in a helical scan video recorder for optimizing the alignment between the video track of a magnetic tape to be read and the scanning path of the magnetic head. In this arrangement, no additional mechanical oscillatory components are required; the desired oscillation along the drum axis is accomplished in an illustrative embodiment by applying a sub-audio train of rectangular pulses to the brake of the tape drive to effect a generally triangular-wave mechanical modulation of the component of tape velocity parallel to the drum axis.

A cyclically varying but monotonically decreasing control signal derived from the resulting triangular-wave modulation of the video signal envelope effects a duration modulation of each pulse at the output of a monostable multivibrator, which is triggered at a sync rate from an auxiliary track on the tape. The duration-modulated pulses from the multivibrator are compared with a standard-duration pulse train to produce a DC error signal whose amplitude and polarity are respectively indicative of the deviation, in amplitude and direction, of the mean locus of the modulated track position with respect to the scanning path of the heads. Such DC error signal is superimposed on the brake to axially shift such mean locus into alignment with the scanning path.

Means may be provided for superimposing a fixed DC voltage onto the DC error voltage when the latter exceeds a predetermined amplitude in either direction to prevent the locking of the multivibrator pulse duration into one or another of its extreme values.

In addition, provision may be mdae to augment the amplitude of the cyclic component of the tape velocity modulation in the presence of a prescribed disturbance pattern (such as spurious noise components comparable in amplitude to the sync signals on the tape).

BRIEF DESCRIPTION OF THE DRAWING

These and other arrangements and features associated with the invention will be further described in the following detailed description taken in connection with the appended drawing, in which.

DETAILED DESCRIPTION

Figure 1:
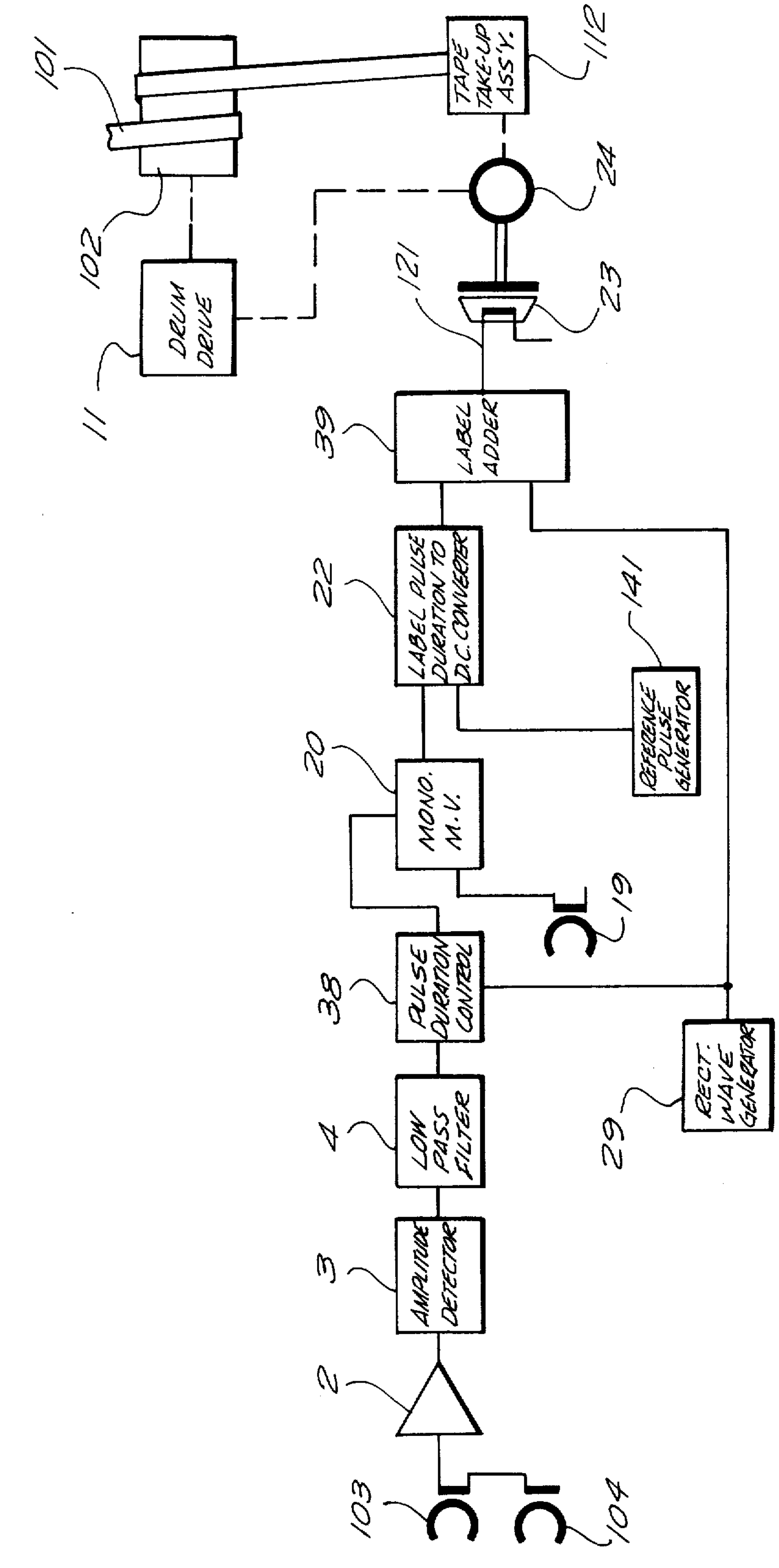
FIG. 1 is a block and schematic drawing of an arrangement in accordance with the invention for aligning a magnetic tape video track with a magnetic head scanning path in a helical scan video recorder.

Referring now to the drawing, FIG. 1 depicts portions of a helical scan video recorder connectable to conventional 60 cycle AC mains (not shown) and having facilities for dynamically aligning a video track of an elongated magnetic tape 10 which is helically wrapped about a drum 102, with the scanning path of a pair of schematically indicated magnetic playback heads 103 and 104 which in practice may be disposed 180° around the periphery of the drum. The drum is rotatable about its axis by means of a suitable drive 111, while the tape is advanced longitudinally by a suitable take-up mechanism 112 driven by a motor 24 in timed relation to the drum rotation.

Typically, the tape includes a plurality of the video tracks disposed in parallel relation at an relatively shallow oblique angle to axis of the tape 101, each track bearing the video information in frequency modulated form. The pitch of the helix defined by the wound tape on the drum is selected so that the video tracks on the tape are generally perpendicular to the drum axis and therefore parallel to the scanning path traced out by the heads 103 and 104 as they rotate with the periphery of the drum 102.

A brake 23 cooperates with the motor 24 to provide a variable drag on the tape advance. Such drag may be varied by a modulating voltage applied to an input 121 of the brake, and will correspondingly vary the advance velocity of the tape relative to the rotational speed of the heads 103 and 104.

Figure 2:
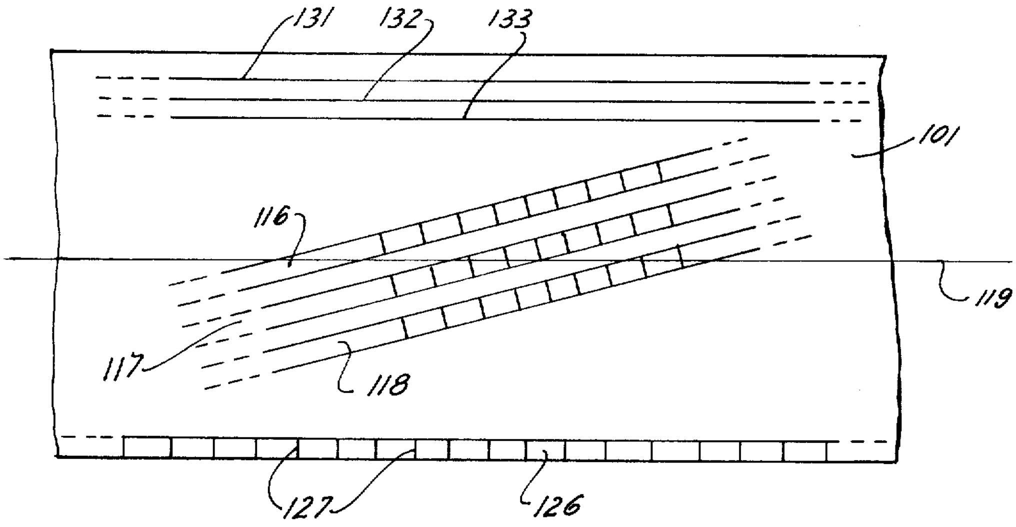
FIG. 2 is a diagrammatic illustration of a portion of the magnetic tape contemplated in FIG. 1.

Referring to FIG. 2, the tape 102 illustratively includes in addition to the oblique video tracks designated at 116, 117, and 118, a sync reference track 126 longitudinally disposed on the tape. Suitable synchronizing signals for the recorder are exhibited as a series of sync indications 127—127 on the track 126. Such indicating may be detected by an auxiliary magnetic head 19 (FIG. 1) at the frequency of the AC mains for purposes to be explained. Audio signals may be recorded on additional longitudinal tracks 131, 132, and 133.

In a well-known manner, alternate ones of the rotating heads 103 and 104 (FIG. 1) scan successive ones of the video tracks during the advance of the tape. Typically, each track bears video information relevant to a complete field of TV picture lines, so that each TV picture frame may be accommodated during a single drum revolution.

The rate of advance of the tape 101 is, in accordance with the invention, subjected to a slow periodic modulation in a prescribed pattern by applying to the brake 23 a suitable voltage whose form preferably corresponds to the time differential of such prescribed pattern. This arrangement tends to compensate for the effect of the mechanical drive system inertia during the resulting modulation swing of the video track location. If, as will be assumed, a generally triangular modulation pattern of the tape velocity is desired (corresponding in shape, for example, to the envelope of the signals depicted in FIG. 4, line a) the modulating voltage will be in the form of a train of rectangular pulses applied to the brake input 121 from a suitable pulse generator 29 through one input of an adder 39.

The resultant oscillation of each video track along a path parallel to the drum axis, while the axial position of the rotating heads remain stationary, causes a corresponding cyclic variation of the amplitude envelope of the video signal detected by the head 103 or 104. This may be seen with the aid of FIG. 4, line a, wherein the parallel dotted lines represent the axially stationary scanning path of the heads, and the triangular pattern superimposed thereon represents amplitude variations in the envelope of the video signal during the abovementioned triangular wave modulation of the locus of the video track with respect to the scanning path. In column A, line a, the center of the modulation swing is depicted as being offset in one direction (i.e., upward as viewed in the drawing) with respect to the scanning path; the unsymmetrical amplitude envelope picked up by the associated one of the heads 103 or 104 will take the form shown in column A, line *b*.

A corresponding set of plots, referenced to the same time base for proper polarity, for the case where the modulation swing is offset in the opposite direction (i.e., downward as viewed in the drawing) with respect to the scanning path as shown at lines *a* and *b* of column C. In this case the unsymmetrical envelope shown at line b has a polarity opposite to that in the corresponding line of column A.

In the event that there is no displacement of the modulation swing with respect to the scanning path so that the track and heads are already aligned, the corresponding plots in column B, lines *a* and *b* will be applicable. As indicated, the amplitude envelope of the video signal will be symmetrical.

The video signal picked up by the head 103 or 104 is applied through an RF amplifier 2 (FIG. 1) to an amplitude demodulation 3, which recovers the depicted triangular amplitude envelope of the video waveform. Such detected envelope is in turn applied through a low pass filter 4 to the input of a pulse duration control circuit 38, described below in more detail in connection with FIG. 3. The circuit 38 adjusts the duration of each output pulse generated by a monostable multivibrator 20 in response to the corresponding sync pulse recorded on the track 126 (FIG. 2) of the tape 101 and picked up by the auxiliary magnetic head 19 of the recorder. In particular, the control circuit 38 translates nonsymmetrical variations in the video amplitude envelope into a unidirectional voltage that varies cyclically at the slow rate established by the rectangular pulse generator 29, which is coupled to an auxiliary input of the control circuit 38. Such unidirectional voltage causes each of the resulting train of pulses at the output of the multivibrator 20 to have a duration which deviates from a standard pulse duration in proportion to the amplitude of the unidirectional voltage and in a direction determined by the polarity of such unidirectional voltage. Thus, the instantaneous duration of the multivibrator output pulse is at any time representative of the magnitude and direction, respectively, of the mean locus of the modulated video track excursion with respect to the scanning path of the heads 103 and 104.

A DC error signal representative at any instant of the magnitude and sense of each pulse width deviation is obtained by suitably comparing the output of the multivibrator 20 and the output of a reference generator 141 of standard-width pulses in a conventional pulse-duration-to-voltage converter 22. The generator 141 may consist in practice of a 2:1 frequency divider responsive to the 60 cycle frequency of the AC mains to deliver a succession of rectangular pulses of predetermined width.

The DC error output of the converter 22 is applied to a second input of the adder 39. Such DC error signal is thus added to the cyclically modulated component operating on the brake 23 from the generator 29, and serves to shift the mean locus of the track modulation path toward the center of the head scanning path until the desired position (e.g., corresponding to that shown in FIG. 4, column B, line i) is achieved. At that point, no DC error component will be generated and the mean locus of the track swing will remain aligned with the scanning path.

In order to prevent the continuous modulation of the tape from causing annoying variations in the reproduced sound level from the audio tracks 131, 132, and 133 (FIG. 2), the repetition rate of the rectangular pulses from the generator 29 is made lower than the lowest audio frequency component recorded on such tracks. Illustratively, such repetition rate may be in the range of 0.1 – 1.0 Hz.

Figure 3:
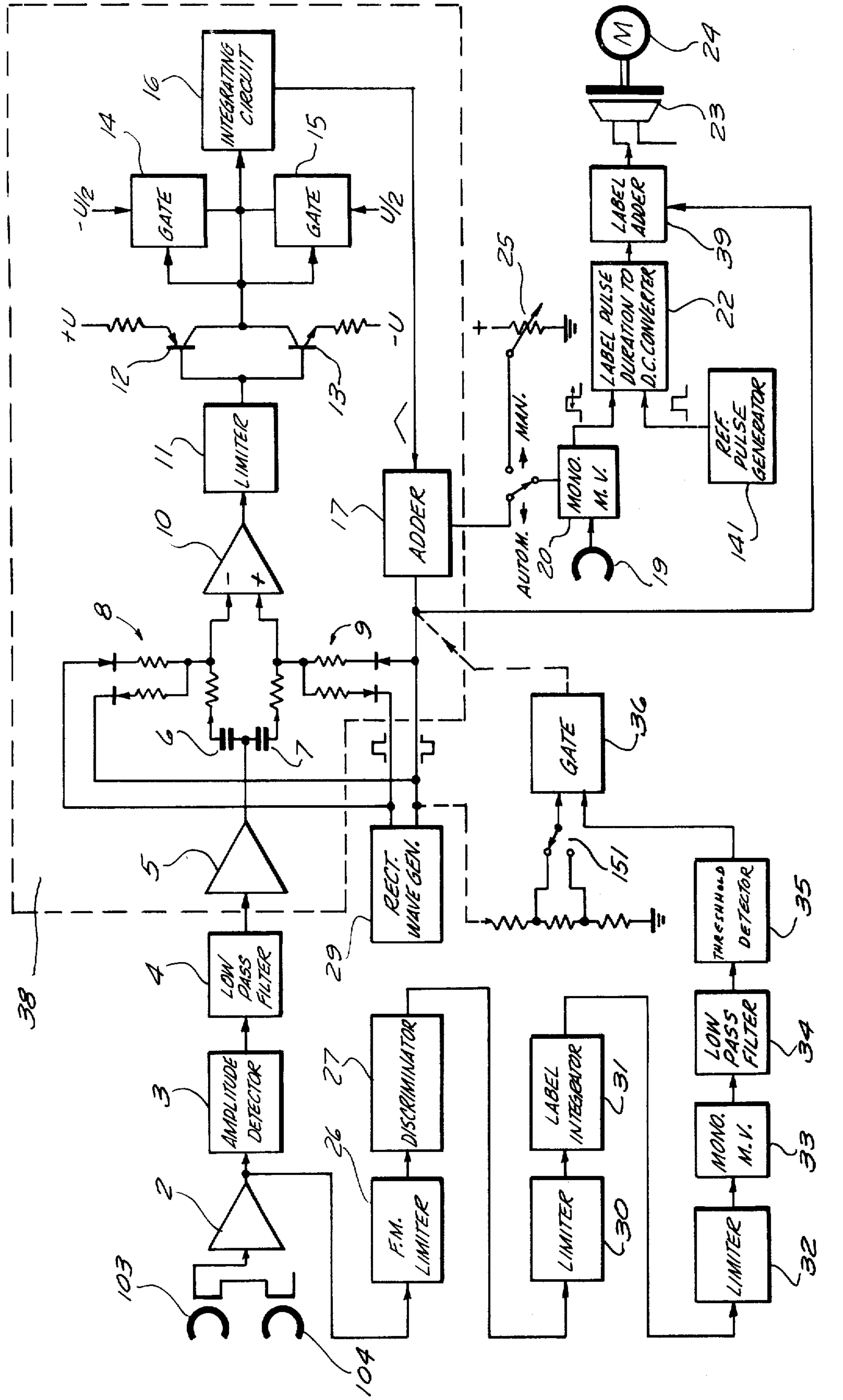
FIG. 3 is a block and schematic diagram of an arrangement similar to FIG. 1 but additionally depicting (a) further details of the pulse duration control circuit of FIG. 1 and (b) auxiliary equipment for performing additional related functions.
Figure 4:
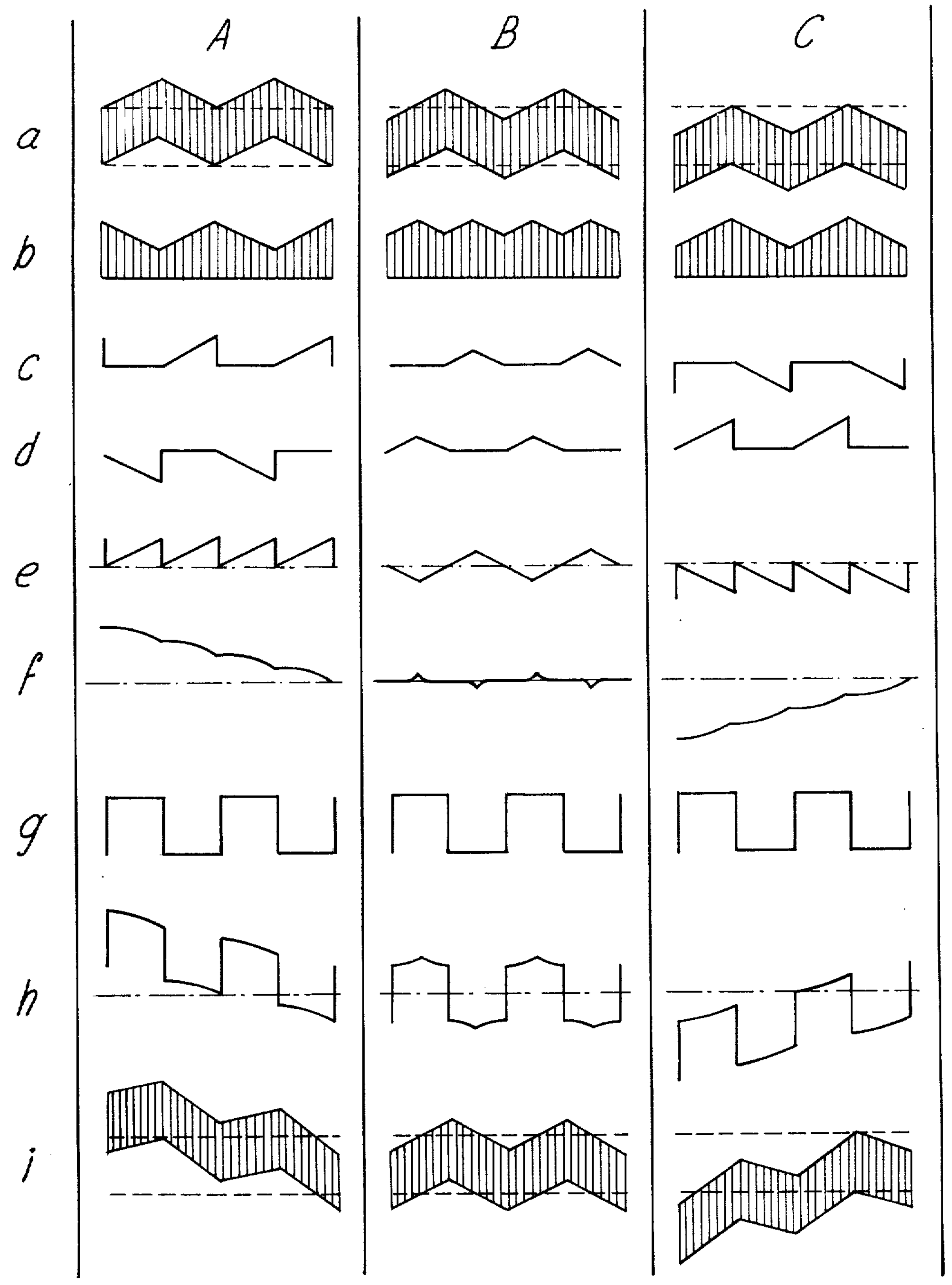
FIG. 4 is a set of curves illustrating waveforms at various points of the arrangements of FIGS. 1 and 3 under different sets of operating conditions.

The pulse duration control circuit 38 is shown in more detail in FIG. 3. The filtered video amplitude envelope at the output of the low pass filter 4 is applied via an amplifier 5 (illustratively having a logarithmic response characteristic) and via capacitors 6 and 7 to respective ones of a pair of diode clamping circuits 8 and 9, which are controlled by complementary outputs of the rectangular pulse generator 29. The circuits 8 and 9 serve to gate their common input voltage to separate inputs of a differential amplifier 10 during respectively opposite half cycles of the rectangular pulses from the generator 29. The resulting voltages at the respective complementary inputs of the amplifier 10 are depicted in FIG. 4, lines c and d. The output of the amplifier 10 is shown at FIG. 4, line e.

The output of the amplifier 10 is applied (after removal of the triangular peaks in the limiter 11) to the bases of complementary transistors 12 and 13. A common output of such transistors exhibits a positive or negative DC current component proportional to the appropriate voltage input of the excited one of the transistors. Such DC current, after integration in a suitable storage circuit 16, exhibits the monotonically varying characteristic shown in FIG. 4, line *f*. Such latter characteristic has been found to be suitable to "walk" the mean locus of the modulation swing back toward the center of the scanning path.

The output of the integrating circuit 16 is combined in an adder 17, with the sub-audio rectangular pulses (FIG. 4, line *g*) from the generator 29. The resulting output of the adder 17 (FIG. 4, line *h*) constitutes the pulse duration control signal for the multivibrator 20 and the corresponding track modulation paths established in response to such pulse duration control signal for the several conditions described above are shown in FIG. 4, line *i*.

For added flexibility, an optional manual control of the pulse duration control voltage may be obtained by incorporating a switch 18 into the arrangement of FIG. 3. The switch 18 is arranged to selectively couple, to the duration adjustment input of the multivibrator 20, either the output of the adder 17 of the circuit 38, or the output of a manually adjustable potentiometer 25.

For large displacements of the mean locus of the modulation swing from the scanning path, it may occur that the corresponding deviation of the multivibrator pulse duration from its reference value may be so large that the multivibrator is locked into a "saturated" condition that is unresponsive to further changes of the duration control signal applied thereto from the circuit 38. To prevent this, a threshold-operated pair of normally disabled gates 14 and 15 are provided in the circuit 38 to reduce the magnitude of the monotonically varying component of the pulse duration control signal. The gates 14 and 15 are individually excited when the DC current at the common output of the transistors 12 and 13 exceeds a predetermined positive or negative value, respectively, so that a voltage U/2 of opposite polarity is superimposed on the input of the integrating circuit 16. Such superimposition will be effective to reduce the maximum duration control voltage applied to the multivibrator 20.

If desired, one of the gates 14 and 15 may be arranged to be triggered upon the turning on of the recorder to apply the associated voltage U/2 to the input of the initially unexcited input of the integrating circuit 16. This will provide an initial offset of the tape modulation swing to help generate an error signal of sufficient magnitude to reliably trigger the alignment circuitry described above.

Figure 5:
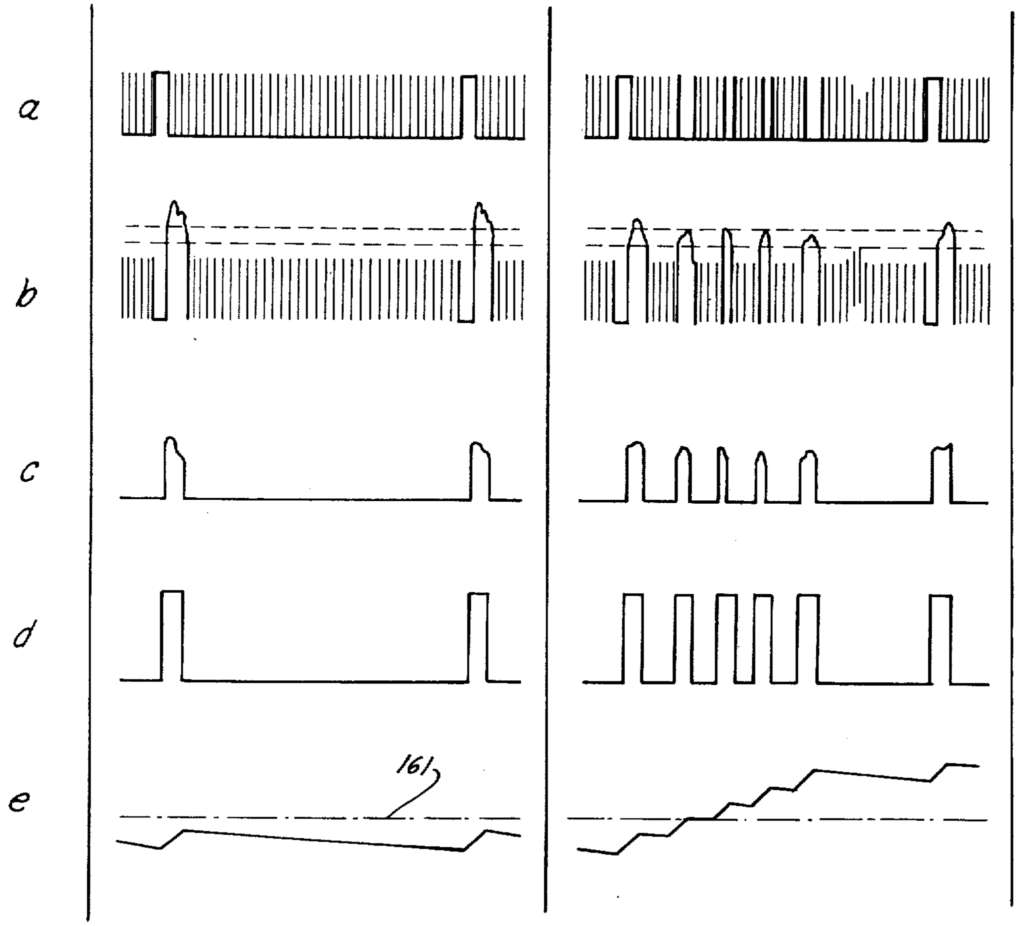
FIG. 5 is a set of curves illustrating waveforms at various other points of the arrangement of FIG. 3 under different operating conditions.

The amplitude of the cyclic modulation of the tape velocity as determined normally by the amplitude of the rectangular pulses at the output of the generator 29 is sufficient to permit the detection of a normal range of track-head misalignments. Under certain disturbance conditions of the video signal, however (as where spurious noise components are significant enough in amplitude to be read as spurious sync signals), severe track-head misalignments undetectable by normal modulation swings can occur. Because of this, the arrangement of FIG. 3 is further provided with disturbance control circuitry for increasing the effective amplitude of the cyclic component of the modulation swing whenever such a disturbance pattern is present. The waveforms at appropriate points of the disturbance control circuitry are shown in FIG. 5 both for normal operating conditions (column A) and disturbed operating conditions (column B).

The disturbance control circuitry includes a supplementary parallel path for coupling the output of the rectangular pulse generator 29 to the adder 17. The path includes a voltage divider 37 (whose ratio is selectable via a switch 151) and a normally disabled gate 36.

In order to operate the gate 36 and thereby augment the modulation swing amplitude, the output of the high frequency amplifier 2 is amplitude-limited in an FM limiter 26 to eliminate the triangular envelope variations and is then demodulated in a discriminator 27. The resulting video signal is applied to limiter 30 to clip the signal at a prescribed level corresponding to the normal sync amplitude (as shown at FIG. 5, line *a*). The output of the limiter 31 is integrated to isolate noise components having amplitudes at or above the sync level (FIG. 5, line *b*). The integrated output is then clipped a second time in circuit 32 at the upper dotted level in FIG. 5, line *b*, and the portion of the waveform remaining above the dotted level of FIG. 5, line *b*, is employed to trigger a monostable multivibrator 33. The output of the multivibrator 33 (FIG. 5, line *c*) is integrated in a low pass filter 34 (FIG. 5, line *d*) and applied to threshold detector 35. If the threshold of the detector 35 is illustratively set at the level indicated at 161 in FIG. 5, line *e*, the presence of normal sync conditions (as in column A) be such that the amplitude of an input voltage 162 to the detector is insufficient to trigger the detector and thereby open the gate 36. However, in the presence of the spurious noise pulses in the video as shown in FIG. 5, column B, the input voltage 162 to the detector 35 indicated on line e will exceed its preset level to open the gate 36 and thereby augment the cyclic modulating signal applied to the adder 17.

In the foregoing, the invention has been described in connection with preferred arrangements thereof. Various modifications and variations will now occur to those skilled in the art. It is accordingly desired that the scope of the appended claims not be limited to the specific disclosure herein contained.

What is claimed is:

1. In a helical scan video recorder adapted for reproducing video signals fixed on an oblique track disposed on an elongated magnetic tape at a relatively small inclination to the tape axis, wherein the recorder includes a drum rotatable about its axis and about which the tape is helically wrapped, a mechanical pick-up head rotatable in a scanning path with the periphery of the drum for detecting video signals recorded on the track, and means for longitudinally advancing the tape, an improved arrangement for correcting misalignments between the video track and the scanning path of the head in a direction parallel to the drum axis, which comprises:

modulating means cooperable with the tape advancing means for varying the rate of advance of the tape in a prescribed mechanical pattern determined by a command signal to effect the variation of the amplitude envelope of the video signal detected by the head;

means for generating a periodic control signal at a sub-audio rate;

pulse forming means having first and second inputs, the pulse forming means being arranged to generate a pulse upon the triggering of the first input thereof, the duration of such pulse being proportional to the magnitude of a voltage applied to the second input thereof;

means for triggering the first input of the pulse forming means at a sync rate;

means for converting nonsymmetrical variations of the video signal amplitude envelope into a unidirectional, monotonically varying voltage whose amplitude is proportional to the amplitude of such variations and whose polarity is indicative of the relative phase of such variations;

first adding means having first and second inputs;

means for applying the output of the converting means to the first input of the first adding means;

means for applying the periodic control signal to the second input of the first adding means;

means for coupling the output of the first adding means to the second input of the pulse forming means, means coupled to the output of the pulse forming means for generating a DC error signal having an amplitude and polarity respectively indicative of the amplitude and sense of the deviation, with respect to a reference pulse duration, of the pulse duration of each pulse at the output of the pulse forming means;

second adding means having first and second inputs, the output of the second adding means defining the command signal;

means for applying the DC error signal to the first input of the second adding means; and means for applying the periodic control signal to the second input of the second adding means.

2. An arrangement as defined in claim 1, further including augmenting means which comprises, in combination, means for amplitude limiting, at a prescribed level, the detected video signal; first means for integrating said limited video signal; a monostable multivibrator; means responsive to the portion of the integrated limited video signal above a predetermined level for triggering the multivibrator; second means for integrating the output of the multivibrator; a threshold detector; means for applying the output of the second integrating means to the input of the threshold detector; a normally inoperative gating circuit; means for applying the output of the threshold detector to a first input of the gating circuit; means for applying the periodic control signal to a second input of the gating circuit; and third means for adding the output of the gating circuit to the periodic control signal.

3. An arrangement as defined in claim 1, in which the periodic control signal has a configuration whose variation with time corresponds generally to the time derivative of the prescribed pattern of mechanical variation of the rate of advance of the tape to compensate for the mechanical inertia of the tape advancing means.

4. An arrangement as defined in claim 1, in which the prescribed mechanical pattern of variation of rate of advance of the tape is a generally triangular wave, and in which the periodic control signal is a train of rectangular pulses.

5. An arrangement as defined in claim 1, in which the tape includes an additional track on which audio signals are recorded, and in which the repetition rate of the periodic control signal is below the lowest frequency recorded on the audio track.

6. An arrangement as defined in claim 5, in which the repetition frequency of the periodic control signal is in the range of 0.1 – 1.0 Hz.

7. An arrangement as defined in claim 1, in which the converting means comprises, in combination, a differential amplifier having first and second inputs; means rendered effective during alternate half cycles of the periodic control signal for individually gating the detected envelope of the video signal to the first and second inputs of the differential amplifier; fourth means for generating a DC current corresponding in amplitude and phase to the voltage at the output of the differential amplifier; and first means for integrating the output of the DC current generating means, the output of the integrating means constituting the output of the converting means.

8. An arrangement as defined in claim 7, in which the arrangement further comprises means rendered effective when the output of the DC current generating means has reached a predetermined amplitude for applying to the first integrating means a predetermined DC voltage of a polarity opposite to that exhibited at the output of the DC current generating means.

9. In a helical scan video recorder adapted for reproducing video signals fixed on an oblique track disposed on an elongated magnetic tape at a relatively small inclination to the tape axis, wherein the recorder includes a drum rotatable about its axis and about which the tape is helically wrapped, a magnetic pickup head rotatable in a scanning path around the periphery of the drum for detecting video signals recorded on a track, means for longitudinally advancing the tape, and modulating means cooperable with the tape advancing means for varying the rate of advance of the tape in a prescribed mechanical pattern in accordance with a periodic control signal applied to the input of the modulating means to effect the variation of the amplitude envelope of the video signal detected by the head, an improved arrangement for selectively augmenting the amplitude of the periodic control signal in the presence of a prescribed video disturbance pattern, which comprises:

a normally unoperated gating circuit having first and second inputs;

means for applying the periodic control signal to the first input of the gating circuit;

means for amplitude-limiting, at a prescribed level, the detected video signal;

first means for integrating said limited detected video signal;

pulse forming means having a triggering input;

means rendered effective when the integrated video signal exceeds a predetermined level in the presence of a video disturbance for triggering the pulse forming means;

second means for integrating the output of the pulse forming means;

a threshold detector;

means for applying the output of the second integrating means to the input of the threshold detector;

means for applying the output of the threshold detector to the second input of the gating circuit; and means for adding the output of the gating circuit to the periodic control signal to augment the amplitude of the periodic control signal.

* * * * *